(12) United States Patent
Peng et al.

(10) Patent No.: US 8,251,339 B2
(45) Date of Patent: *Aug. 28, 2012

(54) MOUNTING APPARATUS FOR STORAGE DEVICE

(75) Inventors: Wen-Tang Peng, Taipei Hsien (TW); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 273 days.

This patent is subject to a terminal disclaimer.

(21) Appl. No.: 12/755,396

(22) Filed: Apr. 6, 2010

(65) Prior Publication Data

US 2011/0175501 A1    Jul. 21, 2011

(30) Foreign Application Priority Data

Jan. 18, 2010  (CN) .......................... 2010 1 0300380

(51) Int. Cl.
*F16M 11/00*    (2006.01)
(52) U.S. Cl. .............. 248/682; 361/679.31; 361/679.37; 361/679.39
(58) Field of Classification Search .................. 248/682, 248/694; 361/679.31, 679.32, 679.33, 679.37, 361/679.38, 679.39
See application file for complete search history.

(56) References Cited

U.S. PATENT DOCUMENTS

| 6,343,009 | B1 * | 1/2002 | Liu et al. | 361/679.31 |
|---|---|---|---|---|
| 6,637,719 | B2 * | 10/2003 | Jiang | 248/682 |
| 7,016,190 | B1 * | 3/2006 | Chang | 361/679.33 |
| 7,492,586 | B2 * | 2/2009 | Peng et al. | 361/679.33 |
| 7,684,181 | B2 * | 3/2010 | Peng et al. | 361/679.33 |
| 7,701,707 | B2 * | 4/2010 | Peng et al. | 361/679.37 |
| 7,729,110 | B2 * | 6/2010 | Zhang et al. | 361/679.33 |
| 8,064,195 | B2 * | 11/2011 | Zhang et al. | 361/679.33 |
| 2005/0190535 | A1 * | 9/2005 | Peng et al. | 361/685 |
| 2009/0091882 | A1 * | 4/2009 | Liu et al. | 361/679.33 |
| 2010/0321879 | A1 * | 12/2010 | Peng et al. | 361/679.33 |
| 2011/0049319 | A1 * | 3/2011 | Peng et al. | 248/309.1 |

* cited by examiner

*Primary Examiner* — Bradley Duckworth
(74) *Attorney, Agent, or Firm* — Altis Law Group, Inc.

(57) ABSTRACT

A mounting apparatus includes a frame, a resilient grounding piece and a fastener both made of conducting material. The frame includes an end arm, a first fixing arm connected to the end arm, and a second fixing arm pivotably connected to the end arm. Two pins protrude from an inner side of each of the first and second fixing arms, for correspondingly engaging in fixing holes of a storage device. The resilient arm is fixed to an outer side of the second fixing arm and includes a resilient arm bending away from the second fixing arm. The fastener is fixed to an inside surface of the resilient grounding piece and is pressed by the resilient grounding piece to extend through the second fixing arm and insert into the threaded hole of the storage device, to connects the storage device to ground cooperating with the resilient grounding piece.

11 Claims, 3 Drawing Sheets

MOUNTING APPARATUS FOR STORAGE DEVICE

CROSS-REFERENCES TO RELATED APPLICATION

Relevant subject matter is disclosed in a co-pending U.S. patent application filed on the same date and having a same title with the present application, which is assigned to the same assignee as named herein.

BACKGROUND

1. Technical Field

The present disclosure relates to a mounting apparatus for a storage device.

2. Description of Related Art

An electronic device, such as a computer, generally includes a plastic frame, and a plurality of screws extending through the frame to fix a storage device and connect the storage device to ground. However, these screws are usually too small and difficult to handle, the installation of the storage device in the computer is labor-intensive. Additionally, because of their small size, the screws are easily dropped, by an assembler, into the computer.

DETAILED DESCRIPTION

Figure 1:
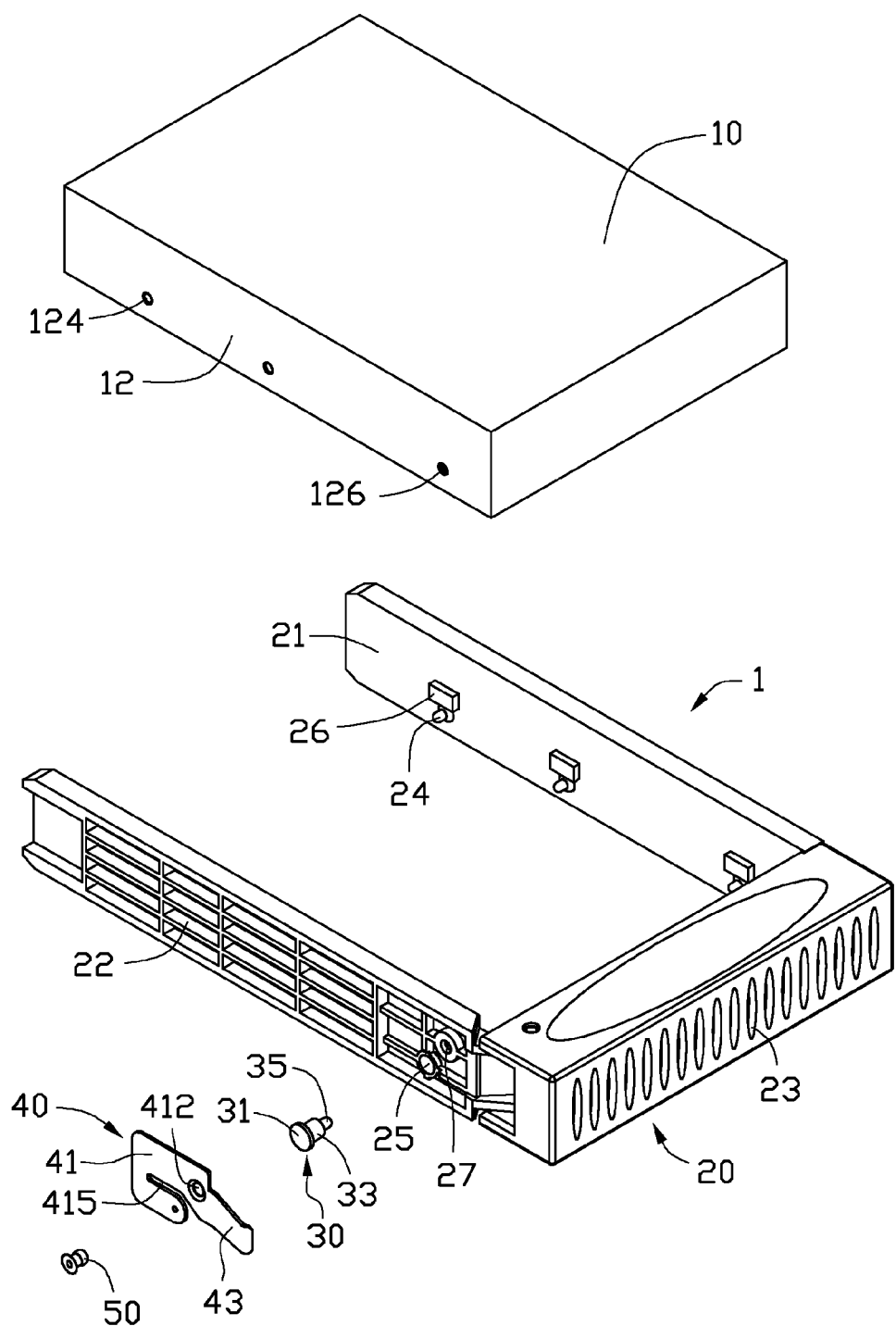
FIG. 1 is a partly exploded, isometric view of an exemplary embodiment of a mounting apparatus together with a storage device.

Referring to FIG. 1, an exemplary embodiment of a mounting apparatus 1 is provided for fixing a storage device 10, such as a hard disk drive. The mounting apparatus 1 includes a frame 20, a fastener 30, and a resilient grounding piece 40.

The storage device 10 includes two opposite sidewalls 12. Two spaced fixing holes 124 and a threaded hole 126 are defined in each sidewall 12. In one embodiment, the fixing holes 124 may be threaded holes.

The frame 20 is made of plastic material, and includes opposite first and second fixing arms 21 and 22, and an end arm 23 perpendicularly connected between the first and second fixing arms 21 and 22. The second fixing arm 22 is pivotably connected to the end arm 23. Three pins 24 protrude from an inner side of the first fixing arm 21, for engaging in the fixing holes 124 and the threaded hole 126 of a corresponding sidewall 12 of the storage device 10. Two pins 24 protrude from an inner side of the second fixing arm 22, for engaging in the fixing holes 124 of the opposite sidewall 12 of the storage device 10. A through hole 25 is defined in the second fixing arm 22, aligning with the threaded hole 126 of the opposite sidewall 12 of the storage device 10. A plurality of washers 26 is fixed to the inner sides of the first and second fixing arms 21 and 22, and adjacent to the pins 24 and the through hole 25 respectively. A mounting hole 27 is defined in an outer side of the second fixing arm 22 adjacent to the through hole 25.

Each fastener 30 is made of conducting material, and includes a head 31, a middle portion 33 extending from the head 31, and a post-shaped engaging portion 35 extending from the middle portion 33 away from the head 31.

Each resilient grounding piece 40 is made of conducting material, and includes a main body 41 and a resilient arm 43 extending from an edge of the main body 41. A bore 412 is defined in the main body 41. The resilient arm 43 bends outwardly relative to the main body 41. A slot 415 is defined in the main body 41 along the extending direction of the resilient arm 43, with an end of the slot 415 extending through the edge of the main body 41 adjacent to the resilient arm 43, to increase elasticity of the resilient arm 43.

Figure 2:
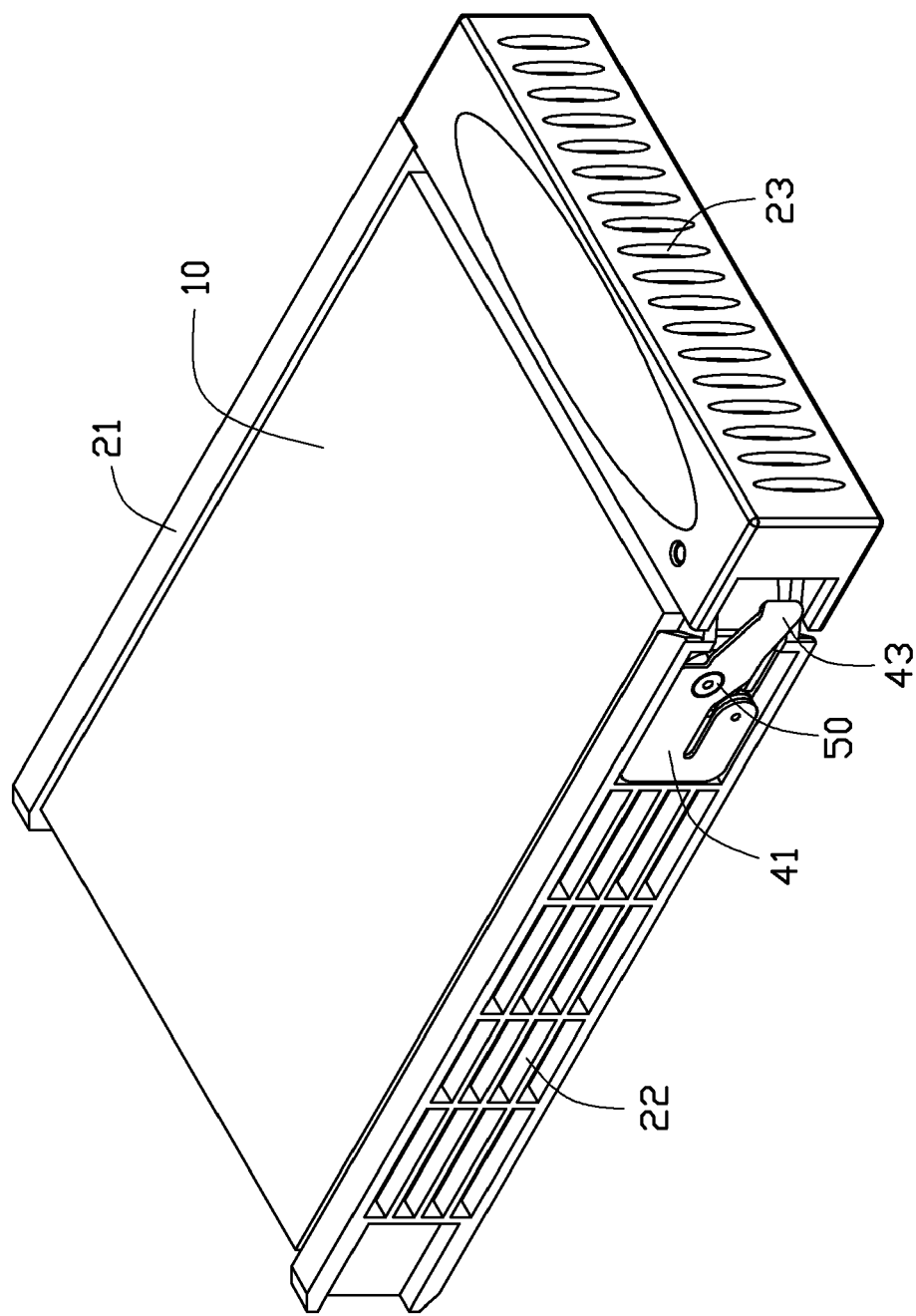
FIG. 2 is an assembled, isometric view of the mounting apparatus and the storage device of FIG. 1.
Figure 3:
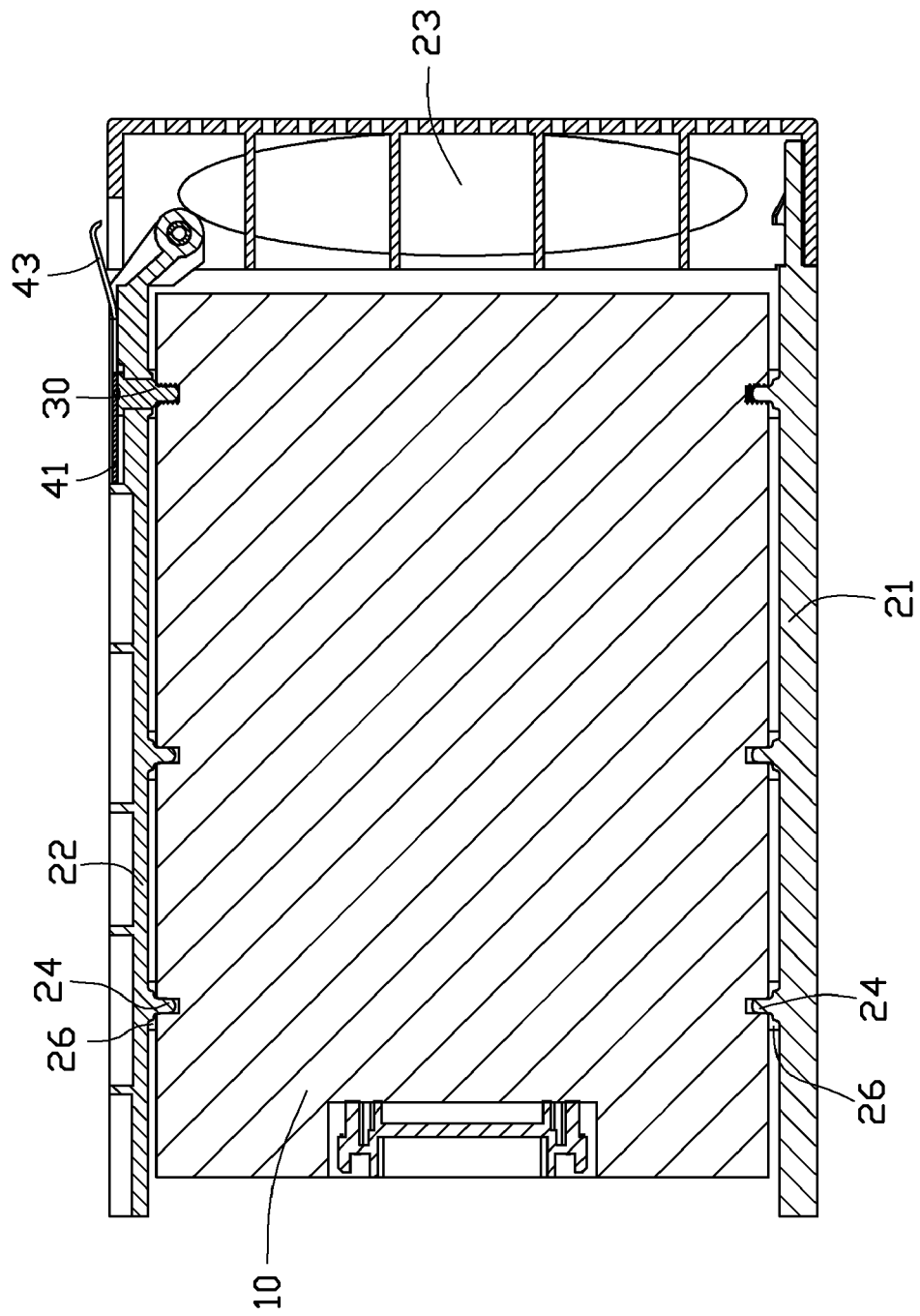
FIG. 3 is a cross-section view of the mounting apparatus and the storage device of FIG. 2.

Referring to FIGS. 2 and 3, to assemble the mounting apparatus 1, the head 31 of the fastener 30 is connected to an inside surface of the main body 41 of the resilient grounding piece 40 adjacent to the bore 412, via a screw or glue. The engaging portion 35 and the middle portion 33 of the fastener 30 extend through the through hole 25 of the second fixing arm 22, to allow the main body 41 of the resilient grounding piece 40 to cling to the outer side of the second fixing arm 22, and to allow the engaging portion 35 to expose through the inner side of the second fixing arm 22. The resilient arm 43 bends away from the second fixing arm 22. A fixing device 50, such as a screw or a rivet, is provided to extend through the bore 412 of the main body 41 of the resilient grounding piece 40, and engage in the mounting hole 27 of the second fixing arm 22. Thereby, the resilient grounding piece 40 is fixed to the outer side of the second fixing arm 22, and presses the fastener 30 towards the second fixing arm 22.

To assemble the storage device 10 into the mounting apparatus 1, the second fixing arm 22 of the frame 20 rotates away from the first fixing arm 21. The storage device 10 is placed between the first and second fixing arms 21 and 22, allowing the pins 24 of the first fixing arm 21 to correspondingly insert into the fixing holes 124 and the threaded hole 126 of a corresponding sidewall 12 of the storage device 10. The second fixing arm 22 rotates towards the storage device 10. The pins 24 and the engaging portion 35 of the second fixing arm 22 are correspondingly inserted into the fixing holes 124 and the threaded hole 126 of the opposite sidewall 12 of the storage device 10. Because the fastener 30 is pressed by the resilient grounding piece 40, a circumference of the engaging portion 35 of the fastener 30 adequately contacts a threaded portion of the threaded hole 126 of the opposite sidewall 12 of the storage device 10. The second fixing arm 22 is locked to the end arm 23 via a locking mechanism (not shown). Thereby, the storage device 10 is fixed to the mounting apparatus 1. The washers 26 of the first and second fixing arms 21 and 22 contact corresponding sidewalls 12 of the storage device 10, to protect the storage device 10 from vibrations.

When the storage device 10 and the mounting apparatus 1 are installed into a bracket of a chassis (not shown), the resilient arm 43 of the resilient grounding piece 40 contacts a sidewall of the bracket, and connects the storage device 10 to ground via the fastener 30.

In this embodiment, the pins 24 of the first and second fixing arms 21 and 22, and the engaging portion 35 of the fastener 30 are bare and have no threaded portions, therefore, the storage device 10 can be easily fixed to the mounting apparatus 1 and need no tools.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A mounting apparatus for a storage device, the storage device comprising two opposite sidewalls, each of the sidewalls defining two fixing holes, and one of the sidewalls defining a threaded hole, the mounting apparatus comprising:
   a frame comprising opposite first and second fixing arms, and an end arm connected between the first and second fixing arms, wherein the second fixing arm is pivotably connected to the end arm, two pins protrude from an inner side of each of the first and second fixing arms, for engaging in the fixing holes of a corresponding sidewall of the storage device, a through hole is defined in the second fixing arm aligning with the threaded hole of the storage device;
   a resilient grounding piece made of conducting material fixed to an outer side of the second fixing arm, and comprising a resilient arm bending away from the second fixing arm; and
   a fastener made of conducting material fixed to an inside surface of the resilient grounding piece, the fastener comprising an engaging portion, the fastener pressed by the resilient grounding piece to allow the engaging portion to extend through the through hole of the second fixing arm and insert into the threaded hole of the storage device, a circumference of the engaging portion adequately contacting a threaded portion of the threaded hole of the storage device.

2. The mounting apparatus of claim 1, wherein the frame is made of plastic material.

3. The mounting apparatus of claim 2, wherein the resilient grounding piece further comprises a main body, the main body is fixed to the outer side of the second fixing arm, the fastener is fixed to an inside surface of the main body, the resilient arm extends outwardly from an edge of the main body.

4. The mounting apparatus of claim 3, wherein a bore is defined in the main body, the fastener is fixed to the main body adjacent to the bore, a mounting hole is defined in the second fixing arm adjacent to the through hole, a fixing device extends through the bore of the main body of the resilient grounding piece and engages in the mounting hole of the second fixing arm, to fix the resilient grounding piece to the second fixing arm.

5. The mounting apparatus of claim 3, wherein a slot is defined in the main body along the extending direction of the resilient arm, with an end of the slot extending through the edge of the main body adjacent to the resilient arm.

6. The mounting apparatus of claim 1, wherein a plurality of washers are fixed to the inner sides of the first and second fixing arms, adjacent to the pins and the through hole of the first and second fixing arms respectively.

7. A mounting apparatus for a storage device, the storage device comprising two opposite sidewalls, each of the sidewalls defining two fixing holes, and one of the sidewalls defining a threaded hole, the mounting apparatus comprising:
   a frame comprising opposite first and second fixing arms, and an end arm connected between the first and second fixing arms, wherein the second fixing arm is pivotably connected to the end arm, two pins protrude from an inner side of each of the first and second fixing arms, for engaging in the fixing holes of a corresponding sidewall of the storage device, a through hole is defined in one of the first and second fixing arms aligning with the threaded hole of the storage device;
   a resilient grounding piece made of conducting material, and comprising a main body fixed to an outer side of the second fixing arm, and a resilient arm bending away from said one of the first and second fixing arms; and
   a fastener made of conducting material fixed to an inside surface of the main body of the resilient grounding piece, the fastener comprising an engaging portion, the fastener pressed by the resilient grounding piece to allow the engaging portion to extend through the through hole of said one of the first and second fixing arms and insert into the threaded hole of the storage device, a circumference of the engaging portion adequately contacting a threaded portion of the threaded hole of the storage device.

8. The mounting apparatus of claim 7, wherein the frame is made of plastic material.

9. The mounting apparatus of claim 7, wherein a bore is defined in the main body, the fastener is fixed to the inside surface of the main body adjacent to the bore, a mounting hole is defined in said one of the first and second fixing arms adjacent to the through hole, a fixing device extends through the bore of the main body of the resilient grounding piece and engages in the mounting hole of said one of the first and second fixing arms, to fix the resilient grounding piece to said one of the first and second fixing arms.

10. The mounting apparatus of claim 7, wherein a slot is defined in the main body along the extending direction of the resilient arm, with an end of the slot extending through an edge of the main body adjacent to the resilient arm.

11. The mounting apparatus of claim 7, wherein a plurality of washers are fixed to the inner sides of the first and second fixing arms, adjacent to the pins and the through hole of the first and second fixing arms respectively.

* * * * *